United States Patent [19]

Pazdernik

[11] Patent Number: 4,810,238
[45] Date of Patent: Mar. 7, 1989

[54] CHAIN GUIDE

[75] Inventor: Irvan L. Pazdernik, Alexandria, Minn.

[73] Assignee: APV Douglas Machine Corporation, Alexandria, Minn.

[21] Appl. No.: 117,473

[22] Filed: Nov. 5, 1987

[51] Int. Cl.$^4$ .............................................. F16G 13/07
[52] U.S. Cl. ..................... 474/207; 474/140; 474/145; 474/151
[58] Field of Search ............... 474/140, 144, 145, 151, 474/206, 207, 219, 222

[56] References Cited

U.S. PATENT DOCUMENTS

| | | | |
|---|---|---|---|
| 2,061,223 | 11/1936 | Cunningham et al. | 474/222 X |
| 3,515,013 | 6/1970 | Wykes | 474/145 |
| 3,616,707 | 11/1971 | Ivaskov et al. | 474/207 |

Primary Examiner—Jerome W. Massie
Assistant Examiner—Matthew Smith
Attorney, Agent, or Firm—Peterson, Wicks, Nemer & Kamrath

[57] ABSTRACT

A chain guide (10) secured to an attachment tab (22) of an attachment link (20) of a roller chain (12) is disclosed for stabilizing the roller chain (12) on a chain rail (14). Chain guide (10) is generally symetrical about longitudinal and lateral axes and includes a central, right parallelepiped portion (26) integrally formed intermediate end portions (34) having a cross section of an isosceles triangle. The surfaces (36) of end portions (34) pilot chain guide (10) onto the chain rail (14). The support surfaces (28) of portion (26) slideably abut the face (16) of the chain rail (14). A socket (46) is provided intermediate and parallel to the support surfaces (28) for slideably receiving the attachment link (20). In the most preferred form, chain guide (10) is secured to the attachment tab (22) by detents (56) formed on the sides (48) of socket (46) for a snap interlock with a hole (24) formed in the attachment tab (22).

20 Claims, 1 Drawing Sheet

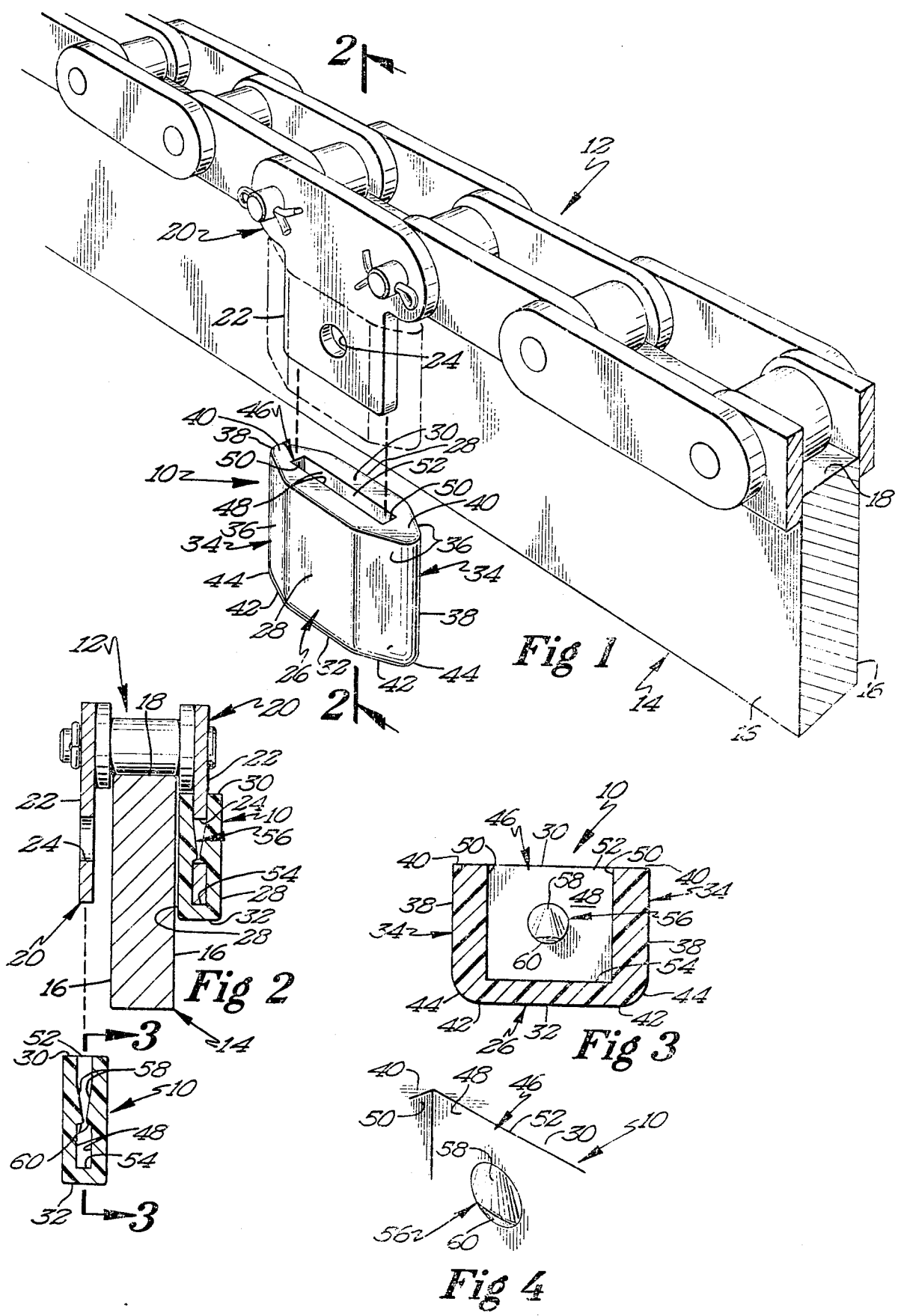

CHAIN GUIDE

BACKGROUND

The present invention relates generally to the stabilization of a roller chain relative to a chain rail and, in the most preferred form, to a chain guide for securement to the roller chain for slideable abutment on the chain rail.

Roller chain is a common method of transferring power. Due to the flexible nature of roller chain and due to the large distances traversed by roller chain, it is often necessary to provide chain rails to support the roller chain. To stabilize the roller chain on the chain rail to prevent the roller chain from being pushed therefrom, it was common prior to the present invention to install elongated guide inserts having U-shaped cross sections into the chain rail. The fabricated chain rails and guide inserts were relatively expensive to manufacture and assemble.

Thus, a need has arisen for a method to stabilize roller chain on a chain guide which is more cost effective and which overcomes the problems encountered in prior roller chain stabilization methods.

SUMMARY

The present invention solves this need and overcomes the problems in roller chain stabilization by providing, in its most preferred form, a chain guide for securement to an attachment tab of a standard attachment link included within the roller chain. The chain guide includes a socket for slideable receipt on the attachment tab. The attachment tab is secured to the chain guide within the socket. The chain guide is formed of relatively low sliding friction material and includes a support surface for slideable abutment on the face of the chain rail.

It is thus an object of the present invention to provide a novel method of roller chain stabilization relative to a chain rail.

It is further an object of the present invention to provide a novel chain guide secured to the roller chain and slideably abutting with the chain rail.

It is further an object of the present invention to provide such a novel chain guide which includes only one piece.

It is further an object of the present invention to provide such a novel chain guide which is easy to manufacture.

It is further an object of the present invention to provide such a novel chain guide which is easy to assemble to the roller chain.

It is further an object of the present invention to provide such a novel chain guide allowing simplified construction of chain rails.

It is further an object of the present invention to provide such a novel chain guide which minimizes power loss and wear.

It is further an object of the present invention to provide such a novel chain guide which is operative in either direction of roller chain movement.

It is further an object of the present invention to provide such a novel chain guide which aligns itself onto the chain rail.

It is further an object of the present invention to provide such a novel chain guide which may be installed without tools.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 1 shows an exploded perspective view of a chain guide for stabilizing a roller chain relative to a chain rail according to the preferred teachings of the present invention.

FIG. 2 shows a cross sectional view of the chain guide of FIG. 1 along section line 2—2 of FIG. 1.

FIG. 3 shows a cross sectional view of the chain guide of FIG. 1 along section line 3—3 of FIG. 2.

FIG. 4 shows a perspective view of one inner side of the socket of the chain guide of FIG. 1.

All figures are drawn for one ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "first", "second", "side", "end", "edge", "face", and similar terms are used herein, it should be understood that these terms have reference only to the structure shown in the drawings as it would appear to a person viewing the drawings and are utilized only to facilitate describing the invention.

DESCRIPTION

A chain guide according to the teachings of the present invention is shown in the drawings and generally designated 10. Chain guide 10 maintains and stabilizes a roller chain 12 upon a chain rail 14 shown on its preferred form as elongated bar stock having faces 16 and a top edge 18. In its most preferred form, chain guide 10 is adapted to be secured to a standard chain attachment link 20 having an attachment tab 22 including a hole 24 formed therein. Attachment tabs 22 may be straight as shown in the drawings or may be bent from roller chain 12.

In its most preferred form, chain guide 10 is a one piece, molded component which is generally symetrical about its longitudinal axis and also about its lateral axis. Specifically, chain guide 10 includes a central, right parallelepiped portion 26 having first and second parallel support surfaces 28, parallel top and bottom sufaces 30 and 32, respectively, and first and second ends which are integrally formed with the bases of first and second end portions 34. End portions 34 in their most preferred form have a cross section of an isosceles triangle and include first and second pilot surfaces 36 having their first edges extending from support surfaces 28 at an obtuse angle and having their second edges joined together along entry edge 38. End portions 34 further include top and bottom surfaces 40 and 42, respectively, which are contiguous with surfaces 30 and 42 and which are perpendicular to surfaces 36 and edge 38. The junction of surfaces 36 and 42 may be rounded as at 44.

In its most preferred form, chain guide 10 further includes a right parallelepiped socket 46 having a size and shape for slideably receiving attachment tab 22. Specifically, socket 46 is defined by first and second parallel sides 48 which are parallel to and spaced from support surfaces 28, first and second ends 50 which are parallel to the ends of parallelepiped portion 26 and the bases of end portions 34 and in the most preferred form are located in end portions 34, an open top 52, and a bottom 54. In its most preferred form, sides 48, ends 50, and bottom 54 are closed to the passage of attachment tab 22 therethrough and in the preferred embodiment are solid. Top 52 allows the slideable insertion of attachment tab 22 therethrough and into socket 46.

For purposes for securing attachment tab 22 within socket 46 of chain guide 10, detents 56 are provided in the most preferred form on sides 48 of socket 46 having a size and shape for a snap interlock with hole 24 of attachment tab 22. In the most preferred form, detents 56 have an arcuate cross section parallel to the longitudinal axis of chain guide 10 as best seen in FIG. 4 and have a cross section parallel to the lateral axis of chain guide 10 and parallel to the direction that attachment tab 22 is slideably inserted into socket 46 through top 52 including a first, ramp surface 58 extending from sides 48 away from open top 52 at a relatively small angle in the range of 165° which intersects generally perpendicularly with a second surface 60 extending from sides 48 away from bottom 54 at an angle in the range of 105° as best seen in FIG. 2. Thus, surface 60 forms a ledge inside of socket 46 for abutting inside hole 24. Surface 58 provides a gradual entry ramp for attachment tab 22. The spacing between detents 56 is less than the thickness of attachment tab 22.

Now that the basic construction of chain guide 10 according to the teachings of the present invention has been explained, the use and advantages of chain guide 10 can be set forth and appreciated. In many installations of roller chain 24, the chain sprockets are spaced such that roller chain 24 has large spans therebetween requiring support be given to roller chain 24 such as by chain rail 14. Chain guide 10 according to the teachings of the present invention assures the roller chain 24 is maintained in position and supported relative to chain rail 14. Specifically, roller chain 24 is provided with link attachments 20 at the desired spacing along the length of roller chain 24.

Chain guides 10 may then be positioned such that open top 52 of socket 46 is in alignment for slideable receipt of attachment tab 22. When chain guide 10 is slid onto attachment tab 22, the free end of attachment tab 22 first encounters detents 56 and rides up on surfaces 58. Due to the reduced spacing between detents 56, attachment tab 22 forces sides 48 apart until detents 56 are in alignment with holes 24 of attachment tab 22. At that time, due to the elastic nature of chain guide 10, sides 48 return to their parallel, unstressed position such that sides 48 abut with the faces of attachment tab 22 and detents 56 extend into and are captured within holes 24 of attachment tab 22.

It can then be appreciated that chain guide 10 is securely held on attachment tab 22. Specifically, surface 60 abuts with hole 24 to prevent chain guide 10 from being pulled from attachment tab 22. Further, due to the ledge formed by the substantially perpendicular angle of surface 60 with respect to side 48 as opposed to the ramp type angle of surface 58, considerable force is necessary before detents 56 will cam out of holes 24 allowing chain guide 10 to be removed from attachment tab 22. Similarly, top surface 30 abuts with link 20 and/or the free end of attachment tab 22 abuts with bottom 54 of socket 46 to prevent further movement of chain guide 10 therebeyond. Likewise, the edges of attachment tab 22 abut with ends 50 of socket 46 to prevent longitudinal movement of chain guide 10 relative to attachment tab 22.

Roller chain 12 may then be positioned on chain rail 14 such that support surface 28 of chain guide 10 is slideably received and supported on face 16 of chain rail 14. In the form shown in the drawings with attachment link 20 including straight attachment tabs 22, chain guides 10 according to the teachings of the present invention are provided to slideably abut on both faces 16 of chain rail 14, with roller chain 12 being slideably received and supported on top edge 18 of chain rail 14. Likewise, when attachment links 20 including bent attachment tabs 22 are utilized, chain guides 10 according to the teachings of the present invention may be provided to slideably abut on faces of spaced chain rails 14, with roller chain 12 being supported between the chain rails 14.

It can then be appreciated that chain guide 10 according to the teachings of the present invention is advantageous in regard to its ability to self align itself on chain rail 14. Specifically, roller chain 12 is often supported between two sprockets by chain rails 14 in its operative run but is allowed to hang between the sprockets in its return run. When roller chain 12 comes around the sprocket toward chain rail 14, chain 12 may have a slight twist which is amplified in attachment tabs 22. Surfaces 36 act as pilots on chain rail 14 camming chain guides 10 and roller chain 12 to the proper position on chain rail 14.

It can then be appreciated that chain guide 10 according to the teachings of the present invention may be attached to roller chain 12 easily, rapidly, and without the use of tools. Further, due to the symetrical construction of chain guide 10 according to the teachings of the present invention, chain guides 10 may be simply snapped on attachment tabs 22 without concern in regard to the direction of travel of roller chain 12. Likewise, chain guide 10 according to the teachings of the present invention is operative in either direction of travel of roller chain 12. It can be further appreciated that chain guide 10 according to the teachings of the present invention are inexpensive to manufacture as a single piece and requires no assembly but can be secured to attachment tabs 22 as they come out of the fabrication mold. Further, the preferred shape of detents 56 according to the teachings of the present invention lends itself to ease of removal of chain guide 10 from its fabrication mold. Likewise, chain guide 10 according to the teachings of the present invention allows chain rail 14 to be standard bar stock requiring no modification thus reducing the cost of manufacture and assembly of chain rail 14. Additionally, chain guide 10 is formed of plastic material which has relatively low sliding friction such that power loss and wear is minimized.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Device for stabilizing a roller chain relative to a chain rail having a first face, a second face parallel to the first face, and a top edge, with the roller chain being supported on the top edge of the chain rail, with the roller chain including at least one attachment link having a first attachment tab and a second attachment tab, comprising, in combination: a first chain guide, with the first chain guide having a support surface for slideable abutment on the first face of the chain rail, with the first chain guide being formed of material having relatively low siding friction with the chain rail; a socket formed in the first chain guide for slideable receipt on the first attachment tab of the attachment link, with the socket including means for securing the first attachment tab of the attachment link in the socket of the first chain guide; a second chain guide, with the second chain guide having a support surface for slideable abutment on the second face of the chain rail, with the second chain guide being formed of material having relatively low siding friction with the chain rail; a socket formed in the second chain guide for slideable receipt on the second attachment tab of the attachment link, with the socket including means for securing the second attachment tab of the attachment link in the socket of the second chain guide.

2. The device of claim 1 wherein the attachment tab includes a hole; wherein the socket is defined by a top, first and second sides, and first and second ends, with the top being open allowing slideable insertion of the attachment tab therethrough and with the sides and ends of the socket being closed to the passage of the attachment tab therethrough; and wherein the securing means comprises at least one detent formed on the side of the socket for receipt in the hole of the attachment tab.

3. The device of claim 2 wherein the attachment tab is slideable in the socket in a first direction; and wherein the detent has a cross section along the first direction including a first, ramp surface extending from the side of the socket at a relatively small angle to force the sides of the socket outwardly during insertion of the attachment tab and a second surface extending generally perpendicular to the first, ramp surface to form a ledge for abutting with the hole of the attachment tab.

4. The device of claim 1 further comprising, in combination: means for piloting the chain guide onto the chain rail.

5. The device of claim 4 wherein the chain guide includes a central portion having a right parallelepiped shape and including the support surface, a second support surface, a first end, and a second end; and wherein the chain guide further includes first and second end portions integrally formed with the ends of the central portion, with the end portions having the piloting means, with the end portions having a cross section of an isosceles triangle, with the base of the isosceles triangle being formed by the ends of the central portion and with the sides of the isosceles triangle being formed by the first and second pilot surfaces.

6. Device for stabilizing a roller chain relative to a chain rail having a face, with the roller chain including at least one attachment link having at least one attachment tab, comprising, in combination: a chain guide, with the chain guide having a support surface for slideable abutment on the face of the chain rail, with the chain guide being formed of material having relatively low siding friction with the chain rail; and a socket formed in the chain guide for slideable receipt on the attachment tab of the attachment link, with the socket including means for securing the attachment tab of the attachment link in the socket of the chain guide.

7. The device of claim 6 wherein the securing means comprises, in combination: means for snap interlocking the attachment tab within the socket.

8. The device of claim 6 wherein the attachment tab includes a hole; wherein the socket is defined by a top, first and second sides, and first and second ends, with the top being open allowing slideable insertion of the attachment tab therethrough and with the sides and ends of the socket being closed to the passage of the attachment tab therethrough; and wherein the securing means comprises at least one detent formed on the side of the socket for receipt in the hole of the attachment tab.

9. The device of claim 8 wherein the attachment tab is slideable in the socket in a first direction; and wherein the detent has a cross section along the first direction including a first, ramp surface extending from the side of the socket at a relatively small angle to force the sides of the socket outwardly during insertion of the attachment tab and a second surface extending generally perpendicular to the first, ramp surface to form a ledge for abutting with the hole of the attachment tab.

10. The device of claim 9 wherein the attachment tab has a free end; and wherein the socket includes a bottom closed to the passage of the attachment tab, with the free end of the attachment tab abutting with the bottom of the socket when the detent is located within the hole of the attachment tab.

11. The device of claim 6 further comprising, in combination: means for piloting the chain guide onto the chain rail.

12. The device of claim 11 wherein the chain guide includes a central portion, with the central portion including the support surface; and wherein the piloting means comprises a first pilot surface extending at an obtuse angle from the support surface.

13. The device of claim 12 wherein the chain guide includes longitudinal and lateral axes, with the chain guide being symetrical about the longitudinal and about the lateral axes.

14. The device of claim 13 wherein the central portion has a right parallelepiped shape and includes the support surface, a second support surface, a first end, and a second end; and wherein the chain guide further includes first and second end portions integrally formed with the ends of the central portion, with the end portions having the first pilot surface and a second pilot surface, with the end portions having a cross section of an isosceles triangle, with the base of the isosceles triangle being formed by the ends of the central portion and with the sides of the isosceles triangle being formed by the first and second pilot surfaces.

15. The device of claim 14 wherein the socket is located intermediate and spaced from the support surfaces of the central portion.

16. The device of claim 15 wherein the socket is defined by a top, first and second sides, and first and second ends, with the top being open allowing slideable insertion of the attachment tab therethrough and with the sides and ends of the socket being closed to the passage of the attachment tab therethrough.

17. The device of claim 16 wherein the securing means comprises, in combination: means for snap interlocking the attachment tab within the socket.

18. The device of claim 17 wherein the attachment tab includes a hole; and wherein the securing means comprises at least one detent formed on the side of the socket for receipt in the hole of the attachment tab.

19. The device of claim 18 wherein the attachment tab is slideable in the socket in a first direction; and wherein the detent has a cross section along the first direction including a first, ramp surface extending from the side of the socket at a relatively small angle to force the sides of the socket outwardly during insertion of the attachment tab and a second surface extending generally perpendicular to the first, ramp surface to form a ledge for abutting with the hole of the attachment tab.

20. The device of claim 19 wherein the attachment tab has a free end; and wherein the socket includes a bottom closed to the passage of the attachment tab, with the free end of the attachment tab abutting with the bottom of the socket when the detent is located within the hole of the attachment tab.

* * * * *